United States Patent [19]
Forni et al.

[11] Patent Number: 5,722,516
[45] Date of Patent: Mar. 3, 1998

[54] DISC BRAKE WITH RIGID CONNECTION BETWEEN LOAD PLATE AND ADJUSTING PISTON

[75] Inventors: Roberto Forni, Novara; Roberto Conti, Varese; Giovanni Sacchi, Novara, all of Italy

[73] Assignee: Meritor Heavy Vehicle Systems, LLC

[21] Appl. No.: 747,139

[22] Filed: Nov. 12, 1996

[51] Int. Cl.$^6$ ............................ F16D 13/75; F16D 55/16; F16D 65/56

[52] U.S. Cl. ............... 188/71.9; 188/72.8; 188/196 BA

[58] Field of Search ..................... 188/71.7, 71.8, 188/71.9, 72.7, 72.8, 72.9, 196 BA, 196 V; 192/111 T, 111 A

[56] References Cited

U.S. PATENT DOCUMENTS

| | | | |
|---|---|---|---|
| 4,615,417 | 10/1986 | Schneider et al. | 188/72.8 |
| 5,123,505 | 6/1992 | Antony | 188/71.9 |
| 5,379,867 | 1/1995 | Macke et al. | 188/72.9 |
| 5,520,267 | 5/1996 | Giering et al. | 188/72.9 |
| 5,582,273 | 12/1996 | Baumgartner et al. | 188/71.8 |

FOREIGN PATENT DOCUMENTS 0703380   9/1994   European Pat. Off. .

*Primary Examiner*—Lee W. Young
*Assistant Examiner*—Chris Schwartz

[57] ABSTRACT

A brake incorporates a load plate directly connected to an adjusting piston. Preferably, a bolt connects the two. The direct connection ensures even pressure from the plate to a friction material, and uniform wear.

In the prior art, the connections tended to allow movement between the load plate and the adjusting piston. With this known type of connection, there has sometimes been uneven wear of the friction material. The present invention which directly fixes the load plate to the adjusting piston provides for even wear on the friction material, and better operation of the brake system.

12 Claims, 3 Drawing Sheets

DISC BRAKE WITH RIGID CONNECTION BETWEEN LOAD PLATE AND ADJUSTING PISTON

BACKGROUND OF THE INVENTION

This invention relates to a rigid connection between the load plate and the adjusting piston in a vehicle disc brake system.

In known disc brake systems, an input rotates an eccentric. The eccentric moves an actuating member to move a load plate and friction material into contact with a rotor. The friction material retards rotation of the rotor.

Preferably, the friction material is normally maintained slightly out of contact with the rotor. In that way, the rotor is able to rotate freely without impediment from the friction material. However, with wear, the friction material tends to be spaced further and further away from the rotor. Adjusting devices have been provided wherein adjusting sleeves adjust the starting position of an adjusting piston. This adjustment moves the friction material closer to the rotor in a non-braking position.

In the prior art, the load plate has been connected to the adjusting piston through an elastic clip connection. This has not always provided positive force transmission between the load plate and the piston. The brake pads which include the friction material experienced tangential wear. With tangential wear the brake may not fully utilize the friction material, and thus the pads require replacement more frequently than would otherwise be necessary.

The prior art system utilized a clip, to connect the adjusting piston on the reverse side of the load plate. The resulting connection is not as reliable as would be desired.

The prior art elastic clip connections have clipped the adjusting piston to the load plate on a first face of the load plate remote from the friction material. This not only results in the uneven wear as described above, but also makes the connection relatively difficult to reach, increasing the complexity of attaching the load plate to the adjusting pistons.

SUMMARY OF THE INVENTION

In a disclosed embodiment of this invention, the load plate is rigidly connected to the adjusting piston. In this way, the force transmitted to the load plate is directly centered and perpendicular to the friction surface. Thus, the wear on the friction surface is not tangential. Rather, there will be uniform wear across the friction surface, thus maximizing the useful life of the pad.

In a disclosed embodiment of this invention, the adjusting pistons are bolted to the piston head. Preferably, a bolt hole extends through a side of the load plate that is to receive the friction material. The bolt extends through that bolt hole and into the adjusting piston. In this way a solid reliable connection is provided. The backing plate of the pad is secured outwardly of the bolts.

A unique adjustment system is disclosed in a co-pending application. The adjusting system utilizes a gear driven adjuster to achieve movement of the adjusting piston.

The inventive connection not only provides the benefits of the direct connection mentioned above, but also results in a relatively easily accessible connection. Thus, assembly of the load plate to the adjusting piston is simplified. Moreover, as explained above, uniform wear of the brake pads is achieved.

These and other features of the present invention are best understood from the following specification and drawings, of which the following is a brief description.

BRIEF DESCRIPTION OF THE DRAWINGS

FIG. 4 is a view of an adjustable gear member.

DETAILED DESCRIPTION OF PREFERRED EMBODIMENT

Figure 1:
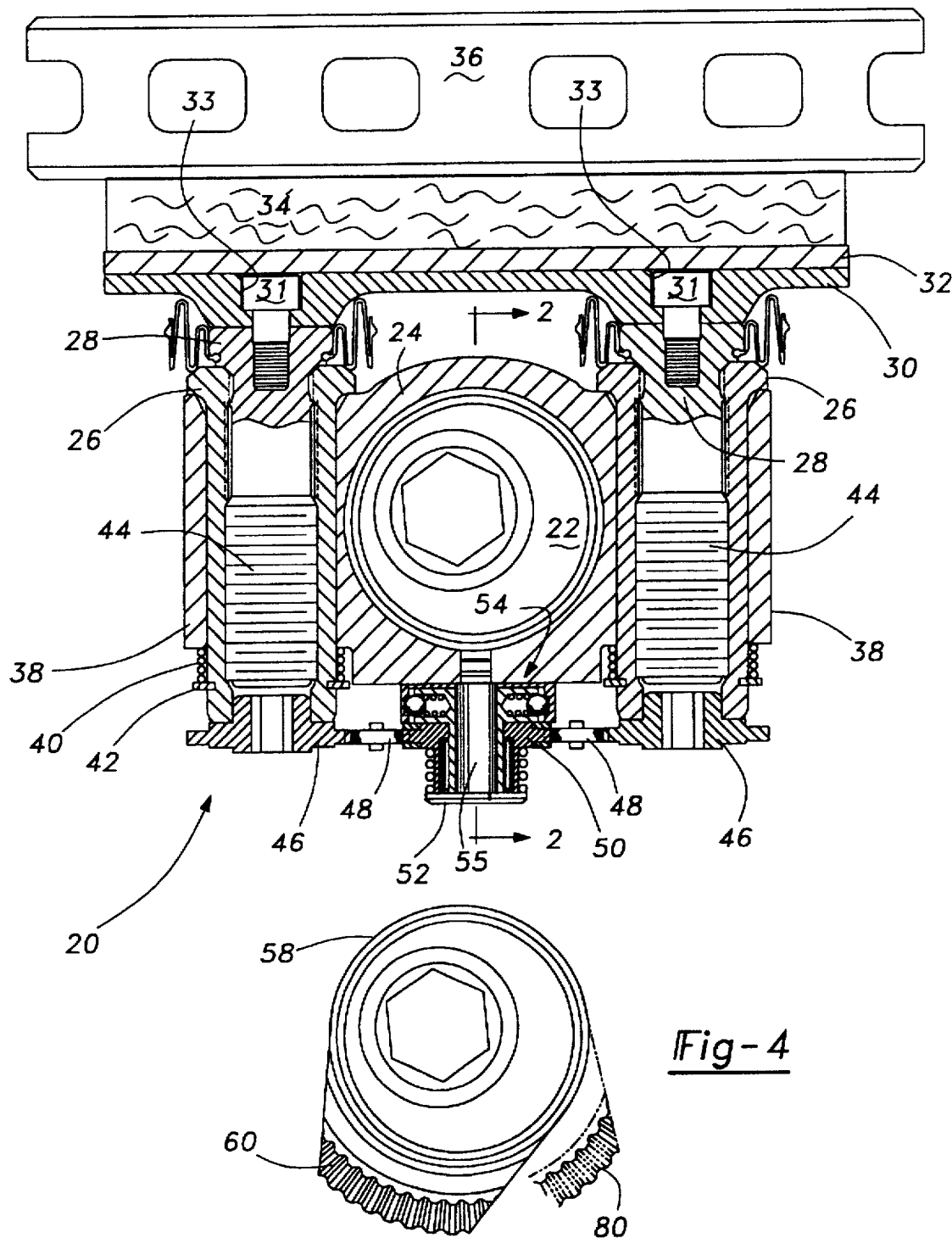
FIG. 1 is a cross sectional view through a brake incorporating the present invention.

A disc brake system 20 is illustrated in FIG. 1. Brake system 20 incorporates an eccentric 22 which is selectably rotated to actuate a brake. An actuation block 24 is reciprocated by eccentric 22. When actuation block 24 is moved (toward the top of the page in FIG. 1), it drives adjusting sleeve 26. This in turn drives adjusting piston 28 forwardly. Load plate 30 is bolted 31 to adjusting piston 28. A brake pad including a backing plate 32 and friction material 34 is secured to adjusting load plate 30. The friction material 34 is shown with the brake actuated and in contact with the rotor 36. The friction material 34 is kept slightly out of contact with the rotor 36 when in a non-braking position.

Bolts 31 secure load plate 30 to the adjusting piston 28 and provide a rigid, and centered, connection between the two. In this way, the force transmitted through block 24 is directly perpendicular to backing plate 22, and friction material 34. Thus, the wear on the friction material 34 is uniform. In the prior art, the wear has sometimes been tangential due to non-direct application of the actuating force.

As shown, the load plate 30 includes bolt holes 33 extending from a side of the load plate that is to receive the friction material 30. The friction material 30 closes bolt holes 33. Bolts 31 extend through bolt holes 33 and into adjusting pistons 28.

Figure 5:
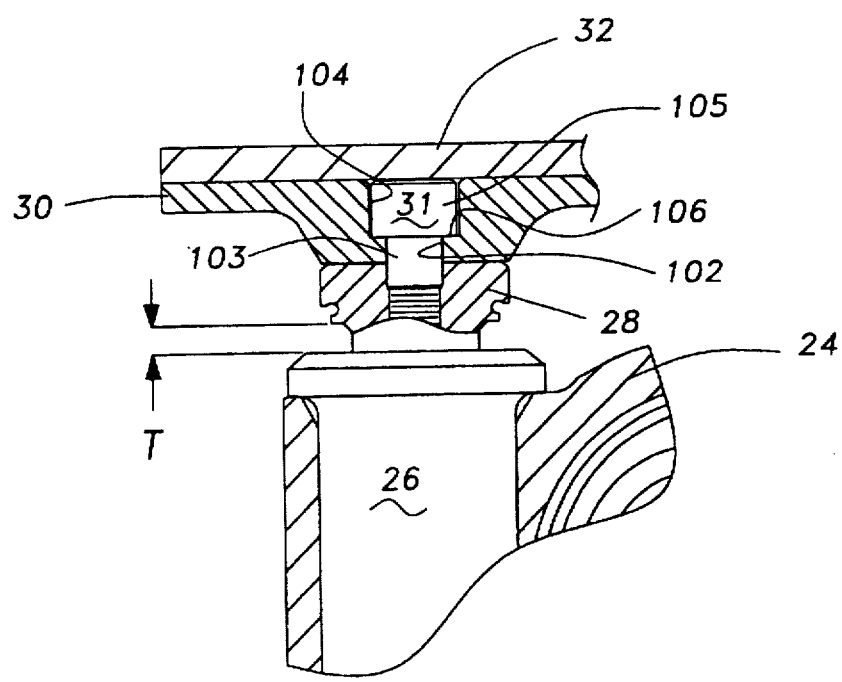
FIG. 5 shows adjustment of the system.

As best shown in FIG. 5, the bolt hole includes a smaller diameter portion 102 receiving a shaft 103 of bolt 31 and a greater diameter portion 104, with a head 105 of the bolt 31 abutting an end wall 106 between the greater diameter portion and the smaller diameter portion. This connection thus rigidly secures the backing plate 30 to the adjusting piston 28.

Thus, a reliable and secure connection is provided.

Block 24 includes outer portion 38 that surrounds sleeves 26. A spring 40 holds sleeves 26 downwardly against block 24. A clip 42 provides a reaction surface for the spring 40, and is secured to sleeve 26.

A threaded adjustment connection 44 between adjusting piston 28 and adjusting sleeve 26 allows for axial adjustment of the location of the piston and sleeve to compensate for wear of the friction material 34. A gear 46 is fixed to rotate with each sleeve 26, which in turn rotates the piston 28 forwardly. The pistons are constrained against rotation by bolts 31, and rotation by sleeves 26 moves piston 28 forwardly due to the threaded connection 44. This brings the location of the friction material 34 closer to the rotor 36. Gear 46 is rotated through idler gears 48 by an adjustment gear 50. A one-way clutch 52 insures that adjustment gear 50 is only rotated in a direction which causes the gears 46 to rotate and move friction material 34 closer to the rotor 36.

The one-way clutch 52 does not allow reverse rotation, and may be a needle bearing one-way clutch as is known in the art. An over-torque load clutch 54 is also included and will be explained in more detail below. A pin 55 is fixed in block 24 and provides a mount spindle for clutch 54.

Figure 2:
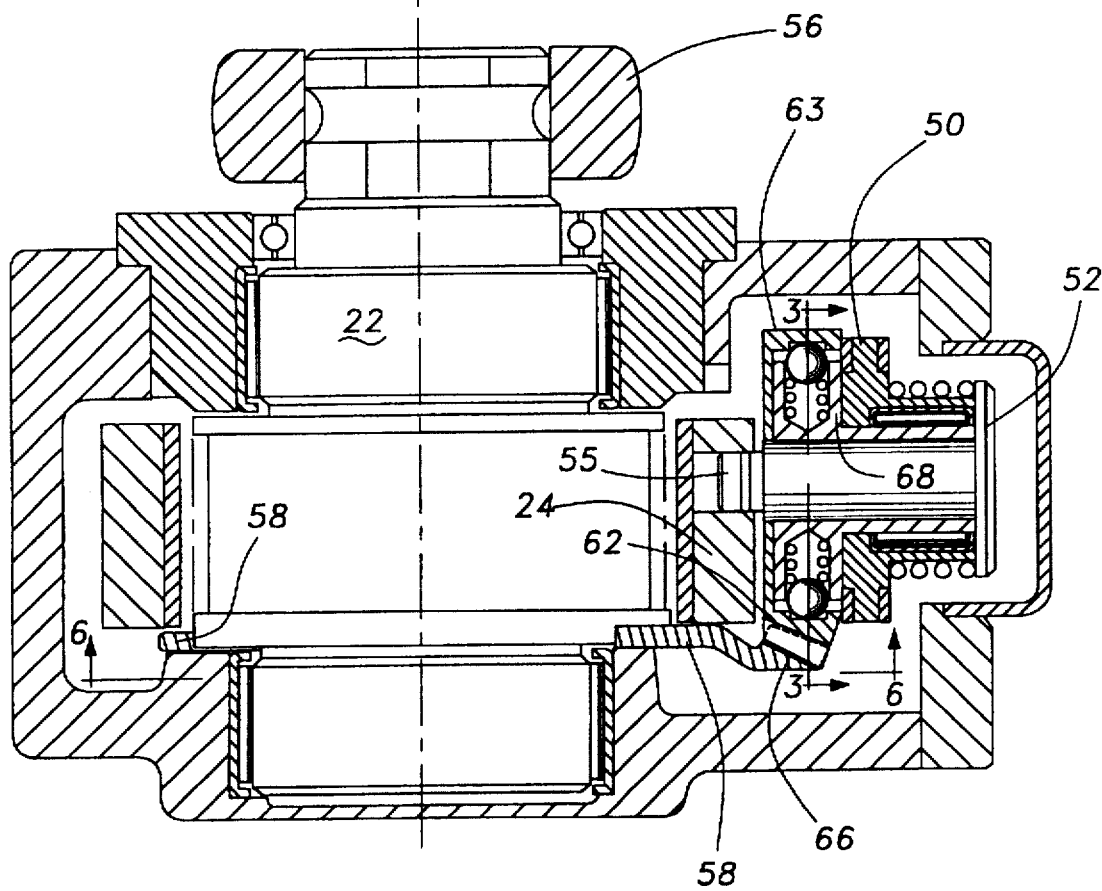
FIG. 2 is a cross sectional view along line 2—2 as shown in FIG. 1.

The brake 20 is shown in FIG. 2 with an actuating lever 56 connected to a drive, not shown. When actuating member 56 is moved, it rotates the eccentric 22 to move the friction material as explained above.

As shown, an adjustment gear section 58 rotates with the eccentric 22. Gear section 58 has teeth 60. Teeth 60 engage mating gear teeth 62 on an outer housing 63 which is incorporated into the over-torque clutch 54. Outer housing 63 rotates an inner housing 68 through the over-torque clutch 54. Inner housing 68 rotates adjustment gear 50 through the one-way clutch 52.

Figure 3:
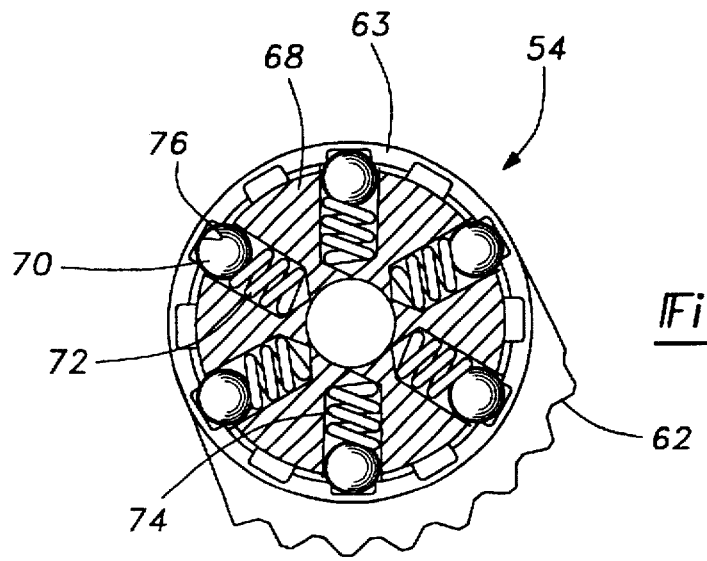
FIG. 3 is a cross sectional view along line 3—3 as shown in FIG. 2.

FIG. 3 shows the over-torque clutch 54. Inner housing 68 is received within outer housing 63. Balls 70 are spring biased 72 outwardly of slots 74 in inner housing 68, and into grooves 76 in the outer housing 63.

The adjustment feature of this invention is explained in greater detail in co-pending patent application entitled "Disc Brake with Gear Driven Adjusting Piston 08/747,141". It should be understood that due to the over-torque clutch, should there be continuing turning of the eccentric after the friction material is in contact with the drum, the over-torque connection allow slippage, and thus no further adjustment of the adjusting piston. Instead, the clutch allows outer housing 63 to rotate relative to inner housing 68.

As shown in FIG. 4, the adjustment gear section 58 includes teeth 60. Upon rotation of the eccentric 22, teeth 60 turn through a portion of a circle to a position such as shown in phantom at 80.

A basic understanding of the adjustment system will now be given with reference to the drawings. Lever 56 rotates eccentric 22. Eccentric 22 moves actuating block 24 to move a sleeve 26, piston 28, load plate 30, backing plate 32, and friction material 34 toward the rotor 36.

At the same time, rotation of eccentric 22 may cause rotation of actuation gear section 58. As will be explained below, there is some limited movement of eccentric 22 before there is corresponding movement of the gear section 58. Teeth 60 rotate teeth 62 and housing 63. If there has been sufficient wear of the friction material 34, over-torque clutch 54 drives inner housing 68. This in turn rotates the adjustment gear 50 through the one-way clutch 52. Rotation of gear 50 causes rotation of the idler gears 48 and adjustment gears 46. This causes sleeves 26 to rotate. Pistons 28 thus are advanced carrying the friction material toward the rotor 36. When eccentric 22 returns to its unactuated position, one-way clutch 52 allows the housing member 63 and 68 to return to a starting position without reversing any adjustment.

FIG. 5 shows the adjustment. As shown, piston 25 has been advanced a distance T.

Figure 6:
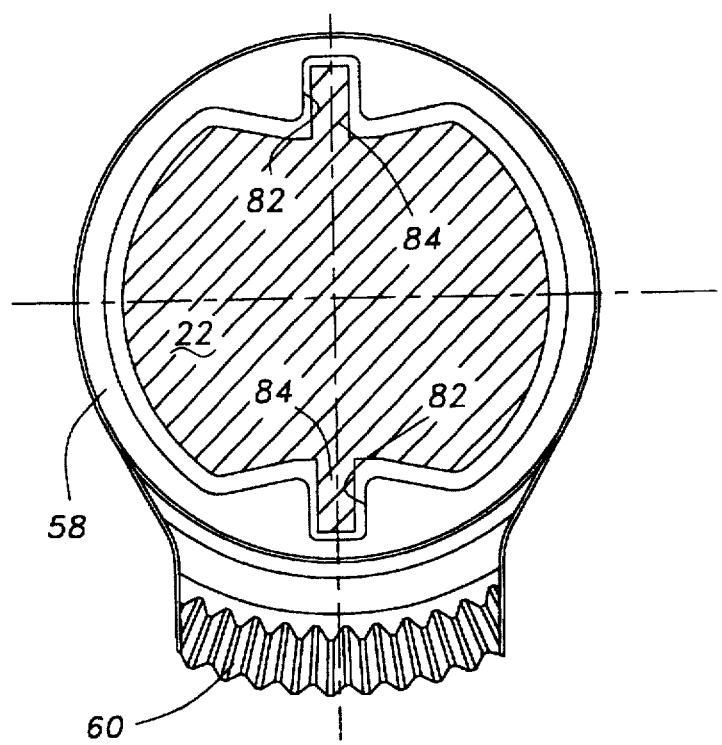
FIG. 6 is a cross sectional view of along line 6—6 as shown in FIG. 2.

FIG. 6 shows eccentric 22 received within a central bore on adjustment gear section 58. A groove 82 is formed at two locations on the gear section 58. Tabs 84 from eccentric 22 are received in grooves 82. The tabs 84 are smaller than groove 82, providing a clearance. In one example, tabs 84 were approximately 6 millimeters while grooves 82 were 8 millimeters. Thus, there is a limited amount of rotation of the eccentric before the gear section 58 will begin to turn. This allows the system to maintain a clearance between the friction material 34 and the rotor 36 in the non-braking position. That is, there will be some initial movement of the eccentric before there is any adjustment through the gear section 58. When the friction material 34 has been replaced or is new, there may be no adjustment due to this clearance. As wear occurs, more and more adjustment occurs.

A preferred embodiment of this invention has been disclosed, however, a worker in the art would recognize that certain modifications will come within the scope of this invention. For that reason, the following claims should be studied to determine the true scope and content of this invention.

What is claimed is:

1. A disc brake system comprising:

a load plate to receive a friction material on a first face;

an eccentric to receive an input, and an actuation member to move said load plate and a friction material upon rotation of said eccentric;

an adjusting piston for adjusting the position of said load plate relative to said actuation member to compensate for wear on a friction material, said adjusting piston being directly connected to said load plate, and on an opposed side of said load plate from said friction material, at least one connecting element extending through said load plate from said first face and into said adjusting piston to securely and rigidly connect said adjusting piston;

structure for moving said adjusting piston upon wear of said friction material; and said load plate including at least one hole extending from said first face toward said second face, and said connecting element extending through said hole to secure said load plate to said adjusting piston in a rigid connection such that there is no relative movement between said load plate and said adjusting piston.

2. A disc brake systems as recited in claim 1, wherein a friction material is positioned on said first face of said load plate and covering said bolt hole.

3. A disc brake system as recited in claim 1, wherein said structure for moving said adjusting piston includes structure for moving said adjusting piston upon rotation of said eccentric.

4. A disc brake system as recited in claim 1, wherein there are two adjusting pistons, each of said adjusting pistons being threadably received within an adjusting sleeve, said structure for moving said adjusting piston including structure for rotating said adjusting sleeve.

5. A disc brake system as recited in claim 1, wherein there are two adjusting pistons each connected to said load plate of said connecting elements.

6. A disc brake system as recited in claim 1, wherein said structure for moving said adjusting piston including an adjusting sleeve operably connected to be rotated by a rotation means, said adjusting piston being threadably received within said adjusting sleeve, such that upon rotation of said adjusting sleeve said adjusting piston is advanced axially.

7. A disc brake system as recited in claim 1, wherein said connecting element is a bolt.

8. A disc brake system as recited in claim 1, wherein said hole includes a first relatively small diameter portion receiving a shaft of said connecting element, and a second greater diameter portion receiving a head of said connecting element, said head abutting an end face of said greater diameter portion such that said connecting element rigidly secures said load plate to said adjusting piston.

9. A disc brake system comprising:

a load plate having a first face for receiving a friction material and a second face to be connecting to an adjusting piston, and a plurality of bolt holes extending from said first face through said load plate to said second face;

a friction material received on said first face of said load plate, enclosing said bolt holes;

an eccentric to receive an input, and an actuation member to move said load plate and said friction material upon rotation of said eccentric;

an adjusting piston for adjusting the position of said load plate relative to said actuation member to compensate for wear on a friction material, said adjusting piston being directly connected to said load plate, with a bolt extending through said bolt hole and into said adjusting piston to secure said adjusting piston to said load plate, said bolt rigidly securing said adjusting piston to said load plate such that there is a rigid connection between said adjusting piston and said load plate and no relative movement; and structure for moving said adjusting piston upon wear of said friction material.

10. A disc brake system as recited in claim 9, wherein there are two adjusting pistons.

11. A disc brake system as recited in claim 9, wherein said structure for moving said adjusting piston includes at least one sleeve threadably receiving said adjusting piston, and said at least one sleeve being operably driven such that upon actuation of said eccentric, said adjusting sleeve is rotated to advance said adjusting piston axially.

12. A disc brake system as recited in claim 9, wherein said bolt hole includes a first relatively small diameter portion receiving a shaft of said bolt, and a second greater diameter portion receiving a bolt head, said head abutting an end face of said greater diameter portion such that said bolt rigidly secures said load plate to said adjusting piston.

* * * * *